(12) United States Patent
Achlioptas et al.

(10) Patent No.: US 7,464,372 B2
(45) Date of Patent: *Dec. 9, 2008

(54) METHODS AND SYSTEMS OF TESTING SOFTWARE, AND METHODS AND SYSTEMS OF MODELING USER BEHAVIOR

(75) Inventors: Dimitris Achlioptas, Seattle, WA (US); Christian H. Borgs, Seattle, WA (US); Jennifer T. Chayes, Seattle, WA (US); Henry J. Robinson, Snohomish, WA (US); James R. Tierney, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 743 days.

This patent is subject to a terminal disclaimer.

(21) Appl. No.: 11/188,606

(22) Filed: Jul. 25, 2005

(65) Prior Publication Data

US 2005/0268287 A1 Dec. 1, 2005

Related U.S. Application Data

(63) Continuation of application No. 09/896,374, filed on Jun. 28, 2001, now Pat. No. 6,996,805.

(51) Int. Cl.
*G06F 9/44* (2006.01)
(52) U.S. Cl. .............. 717/124; 717/125; 717/126; 717/127; 717/132; 717/133
(58) Field of Classification Search ......... 717/124–133; 714/37–39, 45
See application file for complete search history.

(56) References Cited

U.S. PATENT DOCUMENTS 5,870,590 A 2/1999 Kita et al.
5,911,041 A * 6/1999 Schaffer .................. 717/126
6,038,378 A * 3/2000 Kita et al. ................. 714/38

(Continued)

OTHER PUBLICATIONS

Shah, et al. "DSM: An Object-Relationship Modeling Language", 1989, ACM, p. 191-202.*

(Continued)

*Primary Examiner*—Wei Y Zhen
*Assistant Examiner*—Qamrun Nahar
(74) *Attorney, Agent, or Firm*—Lee & Hayes, PLLC

(57) ABSTRACT

Methods and systems of testing software and modeling user actions are described. In some embodiments, multiple different algorithms are provided for operating on a software model. The software model describes behavior associated with software that is to be tested. Different sets of algorithms can be selected for operating on the software model to produce a sequence of test actions that are to be used to test the software. The algorithms can be mixed and matched to achieve a desired testing result. In some embodiments, the different algorithms comprise deterministic algorithms, random algorithms, and various types of algorithms therebetween. In one embodiment, the software model comprises a state graph having nodes that represent state, and links between the nodes that represent actions. The different algorithms that are available for selection can have different graph traversal characteristics such that the state graph can be traversed in different manners. For example, algorithms that are more local in their traversals can be teamed with algorithms that are more global in their traversals, thus covering a wider area of the state space with good local coverage in some areas.

6 Claims, 15 Drawing Sheets

U.S. PATENT DOCUMENTS

| | | | |
|---|---|---|---|
| 6,725,399 B1 | 4/2004 | Bowman | |
| 6,944,848 B2 * | 9/2005 | Hartman et al. | 717/124 |
| 7,302,677 B2 * | 11/2007 | Reissman et al. | 717/135 |
| 2003/0014734 A1 * | 1/2003 | Hartman et al. | 717/125 |
| 2007/0168927 A1 * | 7/2007 | Campbell et al. | 717/104 |
| 2008/0028364 A1 * | 1/2008 | Triou et al. | 717/104 |

OTHER PUBLICATIONS

Chan, et al. "Improving Efficiency of Symbolic Model Checking for State-Based System Requirements", 1998, ISSTA, p. 102-112.*

* cited by examiner

METHODS AND SYSTEMS OF TESTING SOFTWARE, AND METHODS AND SYSTEMS OF MODELING USER BEHAVIOR

RELATED APPLICATION

This application is a continuation of and claims priority to U.S. patent application Ser. No. 09/896,374, filed on Jun. 28, 2001, the disclosure of which is incorporated by reference herein.

TECHNICAL FIELD

This invention relates to methods and systems for testing software or modeling user behavior, and particularly concerns methods and systems for automatically testing software or modeling user behavior.

BACKGROUND

Testing newly developed software is an essential part of the process of software product development. Software developers use a variety of techniques to test software for errors. The techniques that have developed for testing software have sprung from various schools of thought concerning how best to test software.

A first school of thought believes that software changes so much and so frequently that it is not worth automating the testing process at all. Accordingly, many different human software testers are hired to physically test the software. Often the software is tested at a "beta" test site; that is, the software developer enlists the aid of outside users to test the new software. The users, often under a nondisclosure agreement, use the new software and report on any errors found in the software. This is a long and difficult process because many person-years of testing are required to ensure that the new software has no errors. If only one or two beta test sites are used, the process consumes long periods of time because the small number of users are less likely to uncover errors than a large group of testers. As a result, software developers generally use a large number of beta test sites in order to reduce the time required for testing the software. Beta testing, however, is a costly process because of the large number of test sites involved. In addition, people tend to burn out. Further, this method is not the best one to use as the complexity of the software increases. Specifically, as the complexity of the software increases, it becomes more mathematically infeasible that human testers are going to find all or even a good number of the problems with the software.

A second school of thought believes that automated software testing is the preferred approach. This school has spawned many testing paradigms, some of which are discussed below.

A first approach involves using scripts of keystrokes and the like to test the software. That is, static automation scripts are used to exercise the same sequence of commands in the same order every time. These scripts, however, are costly to maintain when the software changes. And, although the tests are repeatable, since they always perform the same commands, they rarely find new bugs.

A second approach involves so-called "monkey testing." In monkey testing, a program is written that defines a series of randomly selected actions that is then executed in connection with the software. Monkey testing can be difficult to use, particularly if you want to direct the testing to a particular part of an application. In addition, because "monkeys" do not understand the application, in their ignorance they can miss many bugs. An exemplary monkey testing approach is described in U.S. Pat. No. 5,513,315.

A third approach pertains to so-called model-based testing. Model-based testing does not record test sequences verbatim, like static test automation does, nor does it bang away at the keyboard blindly like monkey testing. Rather, model-based testing uses a description of the application's behavior to determine what actions are possible and what outcome is expected. This automation generates new test sequences endlessly, adapts well to changes in the application, can be run on many machines at once, and can run day and night.

Exploring model-based testing in somewhat more detail, the following example is given in which a behavioral model is created and used to test a software application. This example is also applicable to other types of models such as production grammars. Additional information can be found in Robinson, *Intelligent Test Automation*, Software Testing & Quality Engineering, Sep./Oct. 2000, Volume 2, Issue 5. The essence of model-based testing is to describe the application behavior that you expect in a way that can be used to generate tests. Two questions can be used for every action that you are going to test:

(1) When is an action possible; and
(2) What is the outcome when this action is executed?

As an example, consider that you have been asked to test the behavior of files in a Window folder. In particular, you are going to test the Create, Delete, and Invert Selection actions. The first thing that is done is that the actions are modeled.

Modeling the "Create" Action

For simplicity, in this example and responsive to question (1) above, Create is only possible in this model when there are 0 files in the folder. Responsive to question (2), the outcome of the Create action is that when you create a file in a folder, the number of files in the folder increases by one. The newly created file is initially Selected, so it appears highlighted in the folder. In fact, the new file is the only Selected file in the folder, no matter how many were Selected before the Create action.

Modeling the "Delete" Action

Responsive to question (1) above, Delete is only possible in this model when there is at least 1 Selected File in the folder. Responsive to question (2) above, the outcome when Delete is executed is that any Selected file disappears from the folder.

Modeling the "Invert Selection" Action

Responsive to question (1) above, Invert Selection is always possible in this model, even when there are 0 Files in the folder. Responsive to question (2) above, the outcome of selecting Invert Selection is that all Selected files in the folder become Unselected, and all Unselected files become Selected. When there are 0 files in the folder, Invert Selection leaves the folder unchanged.

The State Model

With the above information having been defined, a state model can now be constructed that describes the software system's behavior. This technique can, however, work on other types of models as well.

FIG. 1 shows an exemplary state model 100 for the above described system. Model 100 incorporates all of the behaviors described above. Note the way that the Invert Selection action loops from the 0 Files state back to the 0 Files state. That models the way that Invert Selection does nothing if there is nothing to invert.

Now that an abstraction of the application's function has been derived, each of these actions could be manually tested to verify whether the implementation of the Windows folder behaves as expected. This could, however, take too much time and effort. A computer, however, is a logical choice for testing this system. The state model of FIG. 1 can be represented in a format known as a "state table" that the computer can read. Each row of the state table shows the Ending State that will result when an action is applied to the application in the Starting State. The state table effectively allows one to traverse the state space in which the state model is defined. Traversing the state space provides a sequence of test actions that can be performed on the software. As an example, consider the state table immediately below.

| Starting State | Action | Ending State |
| --- | --- | --- |
| 0 Files | Invert Selection | 0 Files |
| 0 Files | Create | 1 Selected File |
| 1 Selected File | Invert Selection | 1 Unselected File |
| 1 Selected File | Delete | 0 Files |
| 1 Unselected File | Invert Selection | 1 Selected File |

Once the information in the state model has been placed into a state table that the computer can understand, the computer can be configured to test the behavior of the system. The computer uses the state table to generate sequences of tests to run against the application.

Random Walk Testing

One simple way to generate test actions is to randomly select any available action from the current state of the application. For example, if you are in the 0 Files Starting State, you can choose either of these two actions:

Invert Selection (which leaves you in the 0 Files State)
Create (which leaves you in the 1 Selected File State)

By choosing random actions in this way, you can generate many unusual sequences and you may eventually exercise all of the actions in the model (for simple models). The issue for a random walk, however, concerns the efficiency of the algorithm. The random walk is very inefficient at reaching all actions given the limited time to for testing.

FIG. 2 shows an exemplary random walk. Notice that the random walk executes the same action (i.e. Invert Selection) four times in a row, but has so far left two other actions untouched. Such is the nature of random walk testing. That is, random walk testing tends to get stuck in localized portions of the state graph. Consider this problem in the context of a very large state space where the state model representing a particular software application or applications has a large number of nodes or states. The problem with using random walk testing in a very large state space is that the random walk tends to be very localized. Thus, achieving a high degree of traversal in the state model is very difficult if not impossible.

Chinese Postman Walk

As noted above, random walks are inefficient at reaching all test actions when the model is large. The problem becomes how to test all of the actions in the model efficiently. This turns out to be the same problem a letter carrier faces when delivering mail. Imagine that each of the actions in the model is a street where mail must be delivered—and that each of the states in the model is an intersection where the letter carrier can change directions. Just as the letter carrier must travel down each street to deliver the mail, we must test each action in the model. And in both cases, we would like to minimize the amount of additional travel needed.

A Chinese mathematician named Kwan Mei-Ko formulated an elegant solution to this problem, and it is known as the Chinese Postman algorithm in his honor. Kwan's method generates a path through the state model that exercises every action in the model in the fewest number of steps. The test sequence listed below covers all five actions in the model in only five steps. This efficiency can be handy if you have a large application that you want to test quickly.

| Action to Execute | Ending State |
| --- | --- |
| Invert Selection | 0 Files |
| Create | 1 Selected File |
| Invert Selection | 1 Unselected File |
| Invert Selection | 1 Selected File |
| Delete | 0 Files |

For more on Kwan's solution, the reader is directed to Kwan, M-K, *"Graphic Programming Using Odd and Even Points"*, Chinese Journal of Mathematics, Vol. 1 (1962).

Some actions in a model, such as hitting Invert Selection with 0 Files in the folder—do not change the state of the application. If you think that bugs are more likely to occur where the application changes state, you may want to prioritize your efforts by first testing the state-changing actions. A simple way to do this is to filter out from the state table any actions that do not change the state. In the table immediately above, this would remove the first action (i.e. Invert Selection). The Chinese Postman solution in software testing is not the best choice because it does not permit exploration in the state space in a relatively uniform fashion, without resorting to an exhaustive approach of visiting every state.

Anti-Random Walk

The shortfalls of random walk testing gave rise to a paradigm called an "anti-random walk". Anti-random walk algorithms essentially keep track of a history of where the algorithm has previously been (i.e. what past nodes in the state model have been tested), and makes a decision to traverse to a next node that is most different from the past nodes. The goal of the anti-random walk is to cover the "far corners" of the state space as efficiently as possible in the shortest amount of time. For example, in testing a specific piece of software that includes MS Word and Internet Explorer, an anti-random walk algorithm might open Word and go to a certain place within the application and store that history in a list. The anti-random walk algorithm would then select a place that is most different, e.g. Internet Explorer, and go there and take some actions (e.g. printing something), and store that history in the list.

In one anti-random walk approach, different "operational modes" are defined. As an example, consider the following operational modes:

Program Running
Program Not running
Main window
Help window
Font
Clock in analog mode
Clock in digital mode Given the various operational modes, it is then very easy to create a rule that is directed to identifying available states for testing (e.g. if Not_Running, then certain states are not available). This allows for implementation of an anti-random walk testing strategy quite easily. For example, if the present state is "Running.Main_Window.Analog", then finding a state that is very different from this one is a matter of using the right algorithm (such as a Hamming distance algorithm) to produce "Running.Font.Digital", where the Hamming distance in this example would be 2.

There are several problems with anti-random walk testing. First, anti-random walk testing is not a realistic representation of the way that people tend to use software. It is nice from the standpoint of enabling large trajectories across the state space that represents the software being tested, but it is still not realistic. Another problem with this approach is that it tends to be deterministic. By "deterministic" is meant that there is no randomness—i.e. everyone who implements the rules will get the same result. Because of its determinism, the approach can become stale and miss bugs in the software. Further, due to the very nature of the anti-random walk approach, the approach does not desirably "drift" or "diffuse". That is, the approach is not well-suited for locally traversing the state space.

Against this backdrop, a continuing need for specific approaches for automated software testing remains unfulfilled. Accordingly, this invention arose out of concerns associated with providing improved methods and systems for automated software testing and modeling user behavior.

SUMMARY

Methods and systems of testing software and modeling user behavior are described. In some embodiments, multiple different algorithms are provided for operating on a software model. The software model describes behavior associated with software that is to be tested. Different sets of algorithms can be selected for operating on the software model to produce a sequence of test actions that are to be used to test the software. The algorithms can be mixed and matched to achieve a desired testing result. In some embodiments, the different algorithms comprise deterministic algorithms, random walk algorithms, and various other types of algorithms therebetween.

In one embodiment, the software model comprises a state graph having nodes that represent states, and links between the nodes that represent actions. The different algorithms that are available for selection can have different graph traversal characteristics such that the state graph can be traversed in different manners. For example, algorithms that are more local in their traversals can be teamed with algorithms that are more global in their traversals, thus covering a wider area of the state space with good local coverage in some areas.

DETAILED DESCRIPTION

Overview

The methods and systems described below provide an approach to automated software testing and user modeling that more closely emulates, in one aspect, the way that people interact with software. The methods and systems can be less deterministic than past systems and go a long way toward preventing staleness. In addition, various methods and systems are extremely flexible and adaptable. Specifically, flexibility is provided, in some implementations, by providing the ability to select from among a potentially large number of test algorithms that can then be used to produce a sequence of test actions that can be used to test the software. These methods and systems are adaptable in the sense that unique collections of algorithms can be selected that are tailored for specifically interacting with a particular type of software. This will become more clear as the description below is read.

Figure 3:
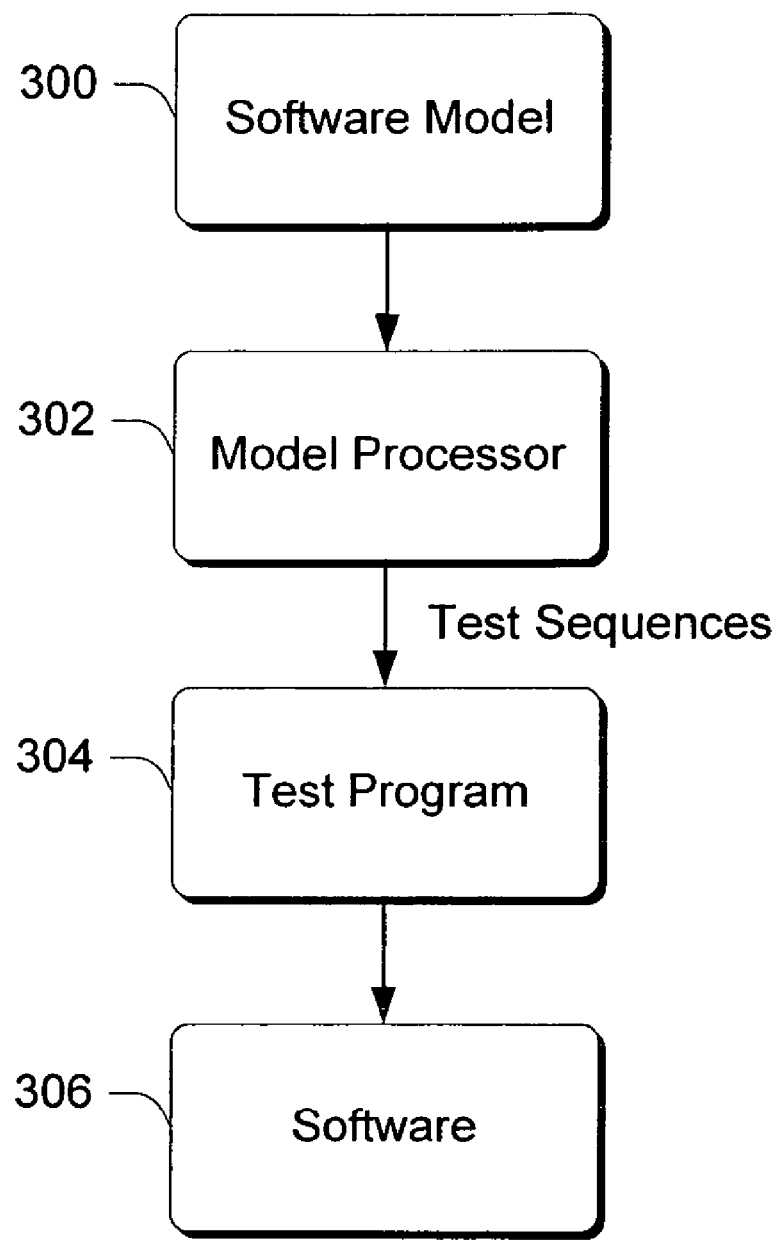
FIG. 3 is a high level block diagram of a software-testing system that can be used in connection with one or more described embodiments.

FIG. 3 shows an exemplary automated software testing system that can be utilized in accordance with the described embodiments. The system comprises a software model 300, a model processor 302, a test program 304, and software 306 that is the subject of the test.

Figure 1:
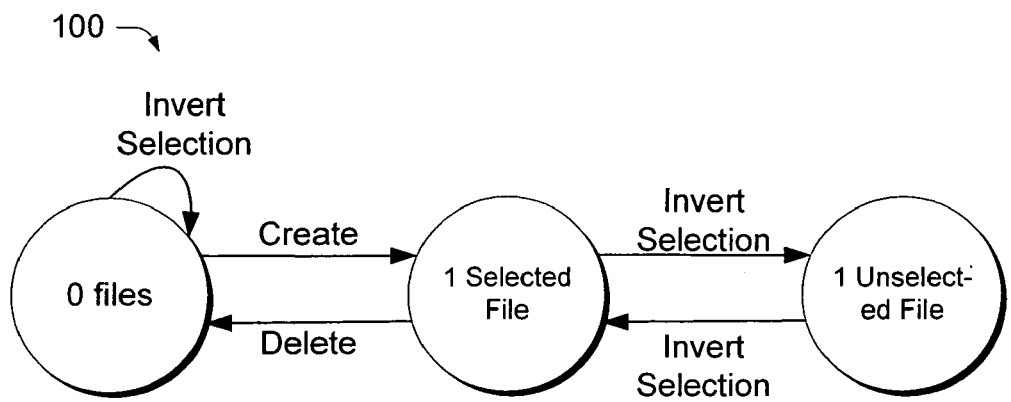
FIG. 1 is state graph that is useful in understanding one or more of the described embodiments.
Figure 2:
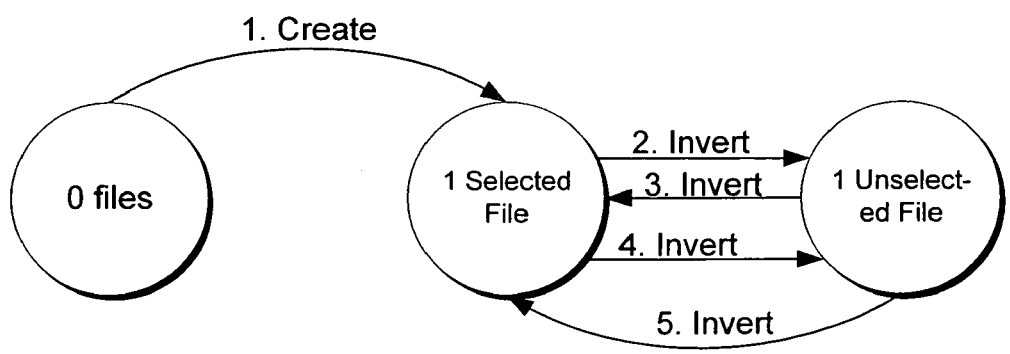
FIG. 2 is state graph that is useful in understanding one or more of the described embodiments.

Software model 300 can comprise any suitable model, including non-finite state models, that can model the behavior of the software system being tested. In the examples of FIGS. 1 and 2 above, the model is defined in terms of a state graph or simply a "graph". Graphs are useful ways to think about software behavior and testing. For example, the application begins in some state (such as "main window displayed"), the user applies some input ("invoke help dialog"), and the software moves into a new state ("help dialog displayed"). Throughout this document the examples will be discussed in terms of graphs that model the software in a state space. It is to be appreciated and understood that these examples are not intended to limit application of the claimed subject matter only to methods and systems that use graphs to model software. Rather, as noted above, the described principles can be used in conjunction with other suitable modeling systems.

Model processor 302 comprises software that uses model 300 to develop a sequence of test actions. In the examples used in this document, model processor 302 is configured to interact with a graph or state diagram that describes the software's behavior. In interacting with the graph or state diagram, the model processor can convert the graph or diagram into a form that is more easily understood by a computer, e.g. a state table, as described above. To this extent, these converted forms of the state graph still effectively permit interaction with state graph in its state space.

The model processor 302 then processes the graph to provide a set of test sequences. The processing of the graph can take place either before the tests are run, or while the tests are running (which makes this interactive). This allows testers to decide to change the algorithm if the particular algorithm has not found a bug within a certain period of time. Thus, traversals can be changed based on the results that are seen by the testers. By processing the graph, the model processor 302 is said to traverse the graph. In the illustrated and described embodiments, model processor 302 traverses the graph by using one or more traversal algorithms that are described below in more detail.

Test program 304 comprises software that receives test sequences that are created by the model processor, and automatically implements the test sequences in connection with software 306.

Exemplary Computer Environment

Figure 4:
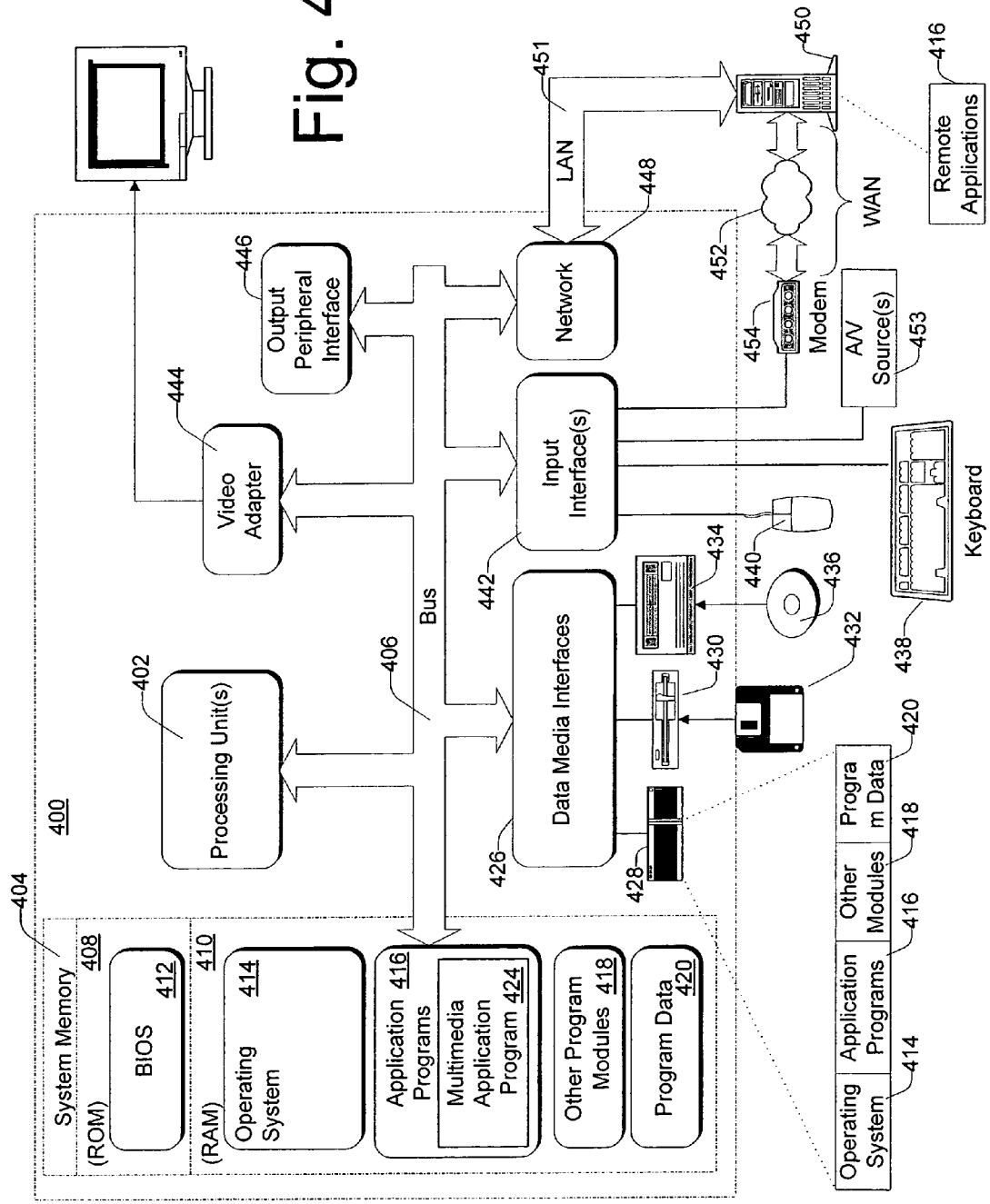
FIG. 4 is a block diagram of a computer system that can be utilized to implement one or more of the described embodiments.

FIG. 4 illustrates an example of a suitable computing environment 400 on which the inventive software testing methods described below may be implemented.

It is to be appreciated that computing environment 400 is only one example of a suitable computing environment and is not intended to suggest any limitation as to the scope of use or functionality of the inventive embodiments described below. Neither should the computing environment 400 be interpreted as having any dependency or requirement relating to any one or combination of components illustrated in the exemplary computing environment 400.

The inventive techniques can be operational with numerous other general purpose or special purpose computing system environments or configurations. Examples of well known computing systems, environments, and/or configurations that may be suitable for use with the inventive techniques include, but are not limited to, personal computers, server computers, thin clients, thick clients, hand-held or laptop devices, multi-processor systems, microprocessor-based systems, set top boxes, programmable consumer electronics, network PCs, minicomputers, mainframe computers, distributed computing environments that include any of the above systems or devices, and the like.

In certain implementations, the inventive techniques can be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 4 computing system 400 is shown comprising one or more processors or processing units 402, a system memory 404, and a bus 406 that couples various system components including the system memory 404 to the processor 402.

Bus 406 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 400 typically includes a variety of computer readable media. Such media may be any available media that is locally and/or remotely accessible by computer 400, and it includes both volatile and non-volatile media, removable and non-removable media.

In FIG. 4, the system memory 404 includes computer readable media in the form of volatile, such as random access memory (RAM) 410, and/or non-volatile memory, such as read only memory (ROM) 408. A basic input/output system (BIOS) 412, containing the basic routines that help to transfer information between elements within computer 400, such as during start-up, is stored in ROM 408. RAM 410 typically contains data and/or program modules that are immediately accessible to and/or presently be operated on by processing unit(s) 402.

Computer 400 may further include other removable/non-removable, volatile/non-volatile computer storage media. By way of example only, FIG. 4 illustrates a hard disk drive 428 for reading from and writing to a non-removable, non-volatile magnetic media (not shown and typically called a "hard drive"), a magnetic disk drive 430 for reading from and writing to a removable, non-volatile magnetic disk 432 (e.g., a "floppy disk"), and an optical disk drive 434 for reading from or writing to a removable, non-volatile optical disk 436 such as a CD-ROM, DVD-ROM or other optical media. The hard disk drive 428, magnetic disk drive 430, and optical disk drive 434 are each connected to bus 406 by one or more interfaces 426.

The drives and their associated computer-readable media provide nonvolatile storage of computer readable instructions, data structures, program modules, and other data for computer 400. Although the exemplary environment described herein employs a hard disk 428, a removable magnetic disk 432 and a removable optical disk 436, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 428, magnetic disk 432, optical disk 436, ROM 408, or RAM 410, including, by way of example, and not limitation, an operating system 414, one or more application programs 416 (e.g., multimedia application program 424), other program modules 418, and program data 420. Some of the application programs can be configured to present a user interface (UI) that is configured to allow a user to interact with the application program in some manner using some type of input device. This UI is typically a visual display that is capable of receiving user input and processing that user input in some way. Such a UI may, for example, comprises one or more buttons or controls that can be clicked on by a user.

Continuing with FIG. 4, a user may enter commands and information into computer 400 through input devices such as keyboard 438 and pointing device 440 (such as a "mouse"). Other input devices may include a audio/video input device(s) 453, a microphone, joystick, game pad, satellite dish, serial port, scanner, or the like (not shown). These and other input devices are connected to the processing unit(s) 402 through input interface(s) 442 that is coupled to bus 406, but may be connected by other interface and bus structures, such as a parallel port, game port, or a universal serial bus (USB).

A monitor 456 or other type of display device is also connected to bus 406 via an interface, such as a video adapter 444. In addition to the monitor, personal computers typically include other peripheral output devices (not shown), such as speakers and printers, which may be connected through output peripheral interface 446.

Computer 400 may operate in a networked environment using logical connections to one or more remote computers, such as a remote computer 450. Remote computer 450 may include many or all of the elements and features described herein relative to computer 400.

As shown in FIG. 4. computing system 400 can be communicatively coupled to remote devices (e.g., remote computer 450) through a local area network (LAN) 451 and a general wide area network (WAN) 452. Such networking environments are commonplace in offices, enterprise-wide computer networks, intranets, and the Internet.

When used in a LAN networking environment, the computer 400 is connected to LAN 451 through a suitable network interface or adapter 448. When used in a WAN networking environment, the computer 400 typically includes a modem 454 or other means for establishing communications over the WAN 452. The modem 454, which may be internal or external, may be connected to the system bus 406 via the user input interface 442, or other appropriate mechanism.

In a networked environment, program modules depicted relative to the personal computer 400, or portions thereof, may be stored in a remote memory storage device. By way of example, and not limitation, FIG. 4 illustrates remote application programs 416 as residing on a memory device of remote computer 450. It will be appreciated that the network connections shown and described are exemplary and other means of establishing a communications link between the computers may be used.

Exemplary Graph

Figure 5:
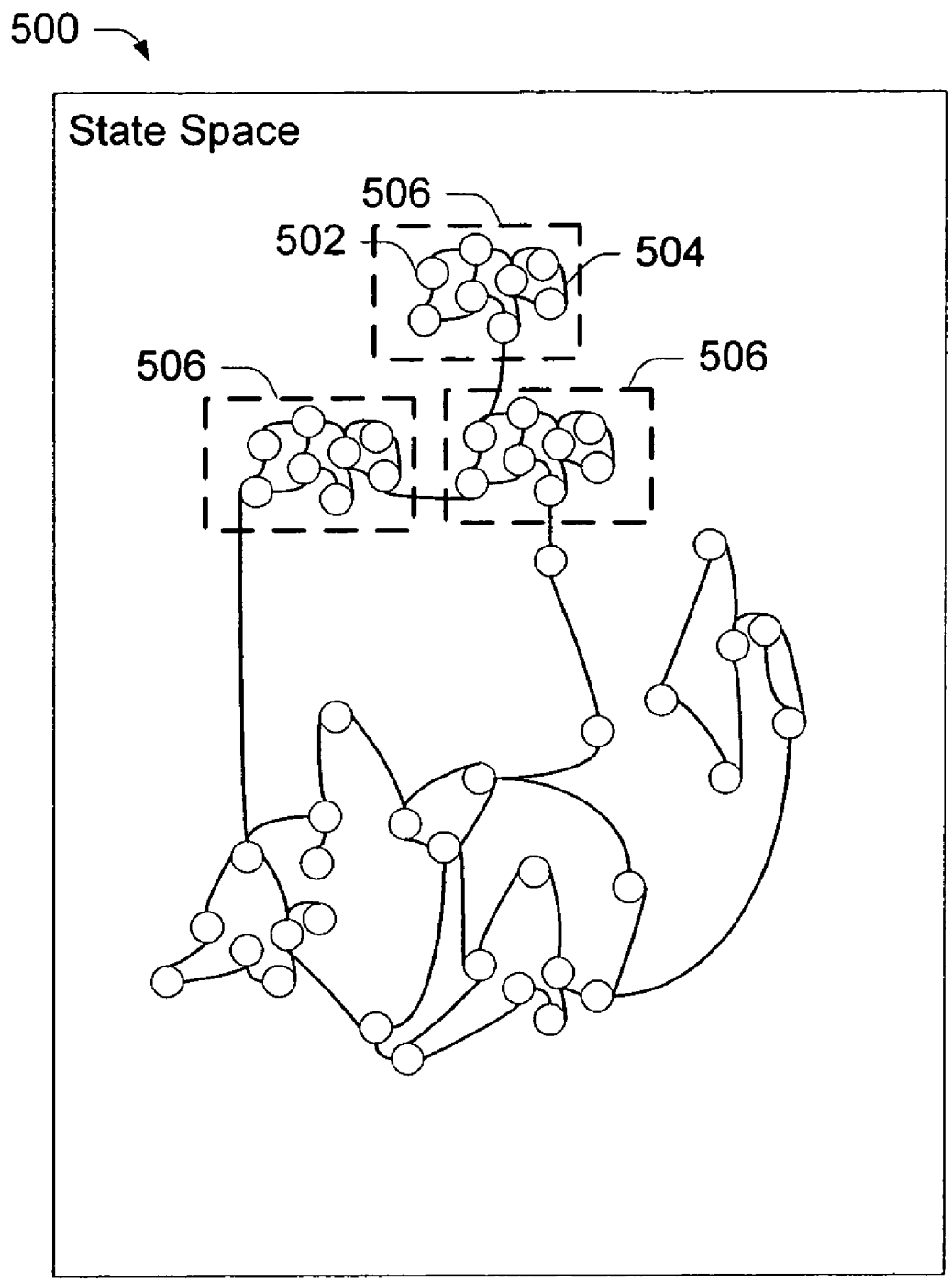
FIG. 5 is an exemplary state graph in state space.

Before undertaking a description of the various inventive software testing methods and systems, consider FIG. 5 which shows an exemplary state graph 500 that models the behavior of software in state space. Graph 500 includes many nodes, an example of which is shown at 502, and various links 504 between the nodes. The nodes represent different states that the software can have, and the links represent user actions that cause transitions between or among the states. It is to be appreciated and understood that graph 500 constitutes a very simple graph and is given for explanation purposes only. Typically, graphs that represent real software are much more complicated than this and can have thousands of nodes and links between the nodes.

In addition, graph 500 illustrates three exemplary clusters of nodes generally at 506. Clusters can be associated with individual programs or sub-components within programs and are typically related in some way. For example, a cluster may contain nodes that are related in terms of their functionality. An example of this can be a Help menu cluster. The Help menu cluster contains multiple nodes each of which are related, in some way, to helping the user. Clusters can also be characterized by graph areas that are highly interconnected with each other as opposed to areas that are not highly interconnected with one another. For example, clusters 506 are all highly interconnected with one another while the rest of the graph is not as highly interconnected.

Testing Using A Random Destination

In accordance with one embodiment, model processor 302 is configured to utilize one or more random destination algorithms to traverse a graph that models the behavior of the software. A characteristic of a random destination algorithm is that the algorithm selects a destination (i.e. node) in the graph, at random, regardless of the present node. The algorithm then proceeds to define a path to that destination. That is, there may have to be a number of steps performed in the process of arriving at the destination node. For example, the algorithm may be in a Help menu in Word, and a destination is selected that requires running a program in DOS. Accordingly, the Help menu and Word are shut down, the computer is restarted, the operating system is switched from NT to DOS, and the program is run in DOS.

Figure 6:
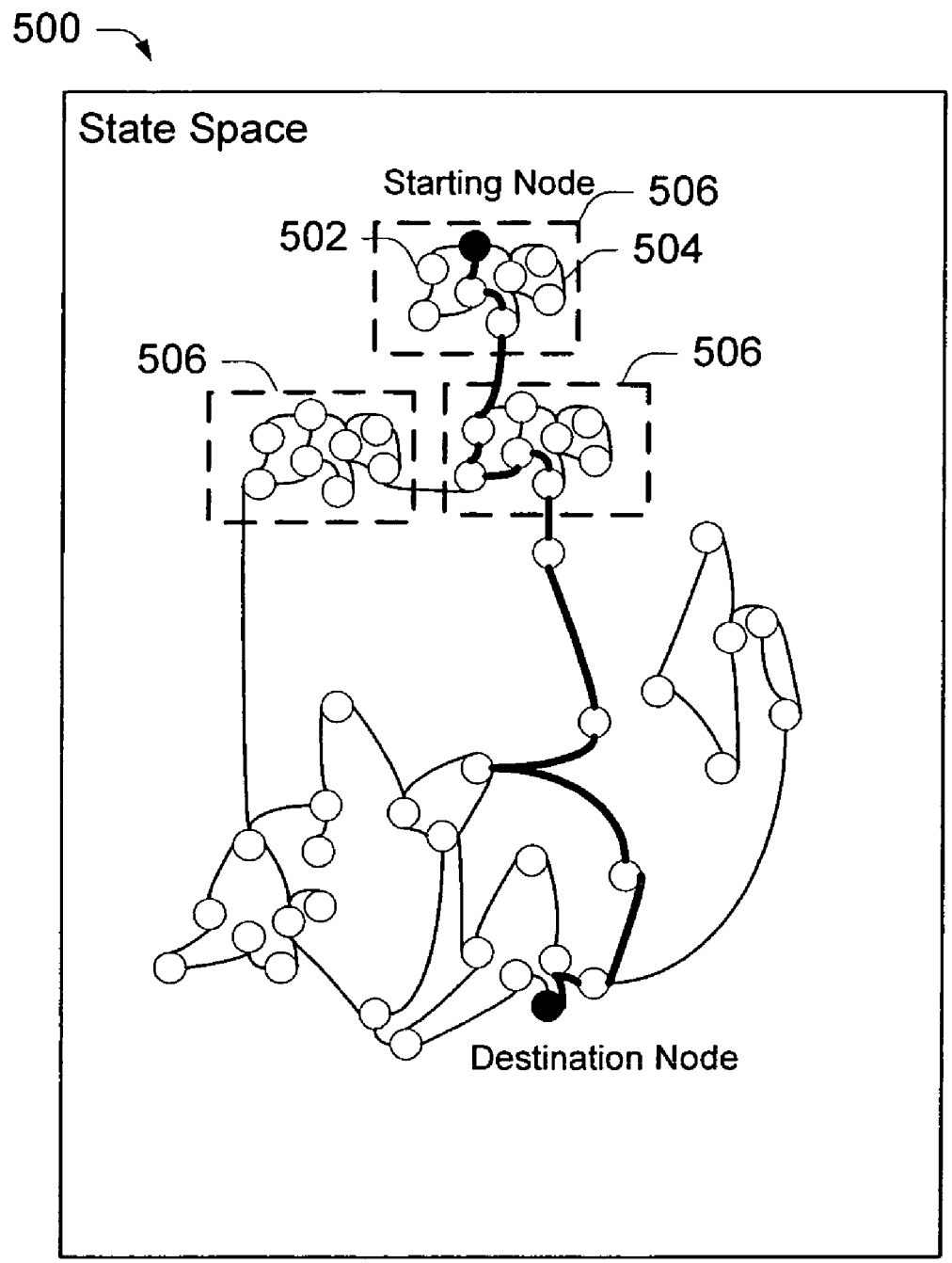
FIG. 6 is an exemplary state graph in state space showing an exemplary graph traversal.

Consider, for example, FIG. 6. There, a starting node is labeled and appears filled in black toward the top of the state space. A destination node is shown toward the bottom of the graph and represents a destination that was selected using a random destination algorithm. A path between the starting and destination nodes is defined as a thick black line. The path between the starting node and the destination node represents the actions that must be performed in order to traverse to that node.

The random destination algorithm is different from random walk algorithms in that it is not dependent on a nearest neighbor node. Specifically, a true random walk algorithm selects from among one or more nearest neighbor nodes and then traverses to the selected node. A random walk can be probabilistically manipulated by making it more probable that a certain neighbor node will be selected over another. But, the random walk algorithm still is dependent on its nearest neighbors. On the other hand, the random destination algorithm is not dependent on a node's nearest neighbor. Specifically, the random destination algorithm is independent of its nearest neighbor nodes. And, while it is possible for the random destination algorithm to select a nearest neighbor node, that probability is typically the same as the probability of selecting a node far away from the present node.

The random destination algorithm is also different from the anti-random walk algorithms. Recall that the anti-random walk algorithms make a choice based on past history. That is, anti-random walk algorithms maintain a list of nodes that have been previously visited and then make a choice that is most different from the previously-visited nodes. In the case of the random destination algorithm, no history is maintained at all. In fact, the algorithm can be configured so that it does not care about its present location. Accordingly, in these instances, no past history is used to make a decision on where next to traverse.

In another embodiment, the notion of clusters can be used by in the random destination algorithm. Recall that a graph can have one or more clusters of nodes. In the FIG. 6 example, three clusters are shown at 506. The random destination algorithm can be configured so that it selects, at random, one of the multiple clusters that might be present in the graph. In this way, the algorithm finds itself into a cluster. Once in the cluster, one or more of the algorithms described below can be used to traverse within the cluster. This approach is advantageous from the standpoint of gaining access to an otherwise difficult-to-access cluster. Recall that some clusters might only have one link in and one link out. Using a random walk algorithm, it would be difficult to randomly find the one link into the cluster. With the random destination algorithm, however, it can be specifically configured to randomly select a cluster as a destination and then traverse inside of the cluster.

Random destination algorithms can be useful in that they can provide a faster traversal of a graph than would be possible using a random walk algorithm. In addition, the random destination is not deterministic and, as such, represents an improvement over the more deterministic anti-random walk approaches. So, in effect, random destination algorithms combine the best features of random and anti-random testing algorithms. On one hand, by picking a destination and going directly to it, they avoid the inefficient "meandering" of random-walk algorithms, thus achieving greater coverage. On the other hand, by picking destinations randomly, they achieve a near-uniform coverage of the state-space, avoiding the determinism of anti-random walks, while making the choice of "next destination" very easy to implement.

Figure 7:
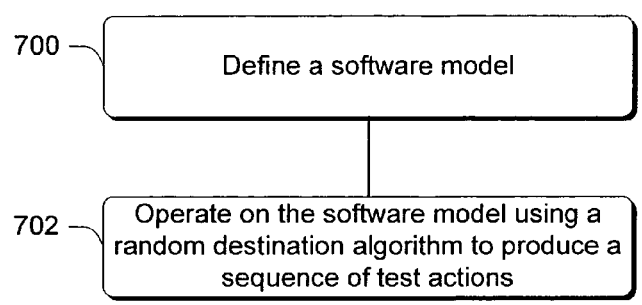
FIG. 7 is a flow diagram that describes steps in a method in accordance with one embodiment.

FIG. 7 is a flow diagram that describes steps in a method in accordance with one described embodiment. The method is advantageously implemented in software. In the FIG. 3 example, the method is implemented, in part, by model processor 302.

Step 700 defines a software model. Any suitable model that is capable of describing software behavior can be utilized. In the present example, the model of choice is a state graph or state table that is derived from a state graph. Step 702 operates on the software model using a random destination algorithm to produce a sequence of test actions. The sequence of test actions can have one or more test actions. In the described embodiment, this step is implemented by selecting a destination random node appearing in the graph, and traversing the state space to arrive at that node. Destinations can be selected independent of the present node. In addition, such selection can be independent of any past history—i.e. past nodes in the graph that have been traversed.

In one particular embodiment, step 700 comprises defining one or more clusters of nodes. Node clusters can be defined in any suitable way. For example, the clusters can be defined by observing where large interconnectivities occur in the graph. Alternately, cluster definitions can be formed by data mining user data. With the clusters having been defined, step 702 is implemented by selecting, at random, a cluster from the clusters that are defined in the graph. Doing so, as noted above, carries with it advantages that access to the cluster is more easily facilitated than with other testing techniques.

Testing Using Multiple Algorithms

As noted above, there are shortfalls to various individual algorithms that make them non-ideal in various software testing scenarios. For example, random walk algorithms tend to walk in small areas of the graph. That is, the algorithms tend to get stuck in very localized portions of the graph. That leads to traversal problems in that the random walk algorithms tend not to traverse wide distances in the graph. In addition, random walk algorithms can be quite slow. Anti-random walk algorithms, on the other hand, are good for traversing wide distances in the graphs, but often times this distance is too wide. Thus, such algorithms tend to be very artificial in that they do not accurately represent actions that a person might take. Also, these algorithms do not locally explore a region of the graph as thoroughly as would be desirable in some instances. Further, the algorithms tend to be too deterministic.

In an effort to arrive at software testing scenarios that more closely represent actions that a user might actually employ, the inventors have implemented various approaches that blend algorithms that can be very different in nature and effect.

Figure 8:
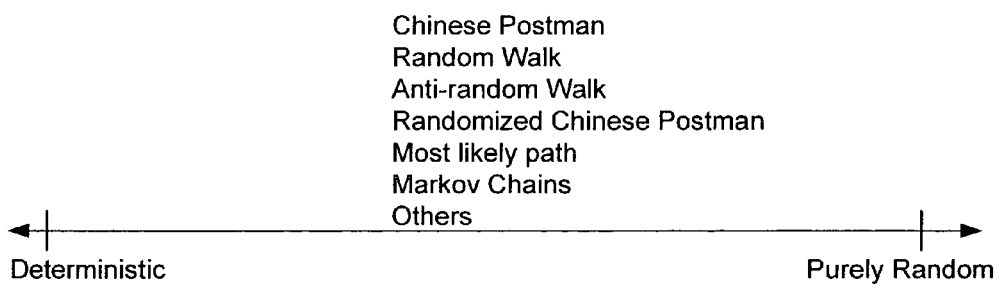
FIG. 8 is an illustration of various types of algorithms that can be used in connection with one or more described embodiments.

Consider, for example, FIG. 8 which shows a spectrum that extends from deterministic to purely random. Within this spectrum many of the different types of algorithms that can be used to test software are found. In this specific example, the algorithms can include Chinese Postman, Random Walk, Anti-random Walk, Randomized Chinese Postman, Most Likely Path, Markov Chains and various others. These algorithms are all known and will be understood and appreciated by those of skill in the art. Additionally, these and other algorithms can have properties which, when manipulated, can be used to move the algorithm along the spectrum in a certain direction. For example, when working with a particular algorithm that is more deterministic, by adjusting one or more properties of the algorithm, it can be made more random.

It is to be understood that it is not the intention of the present document to exhaustively describe all of the possible algorithms that might be employed to test software. Various algorithms will be known and understood by those of skill in the art. Rather, it is the goal of this document to describe different approaches to testing software that can use, as tools, all of the various software testing algorithms, now known or subsequently developed, that are typically used for testing software.

Figure 9:
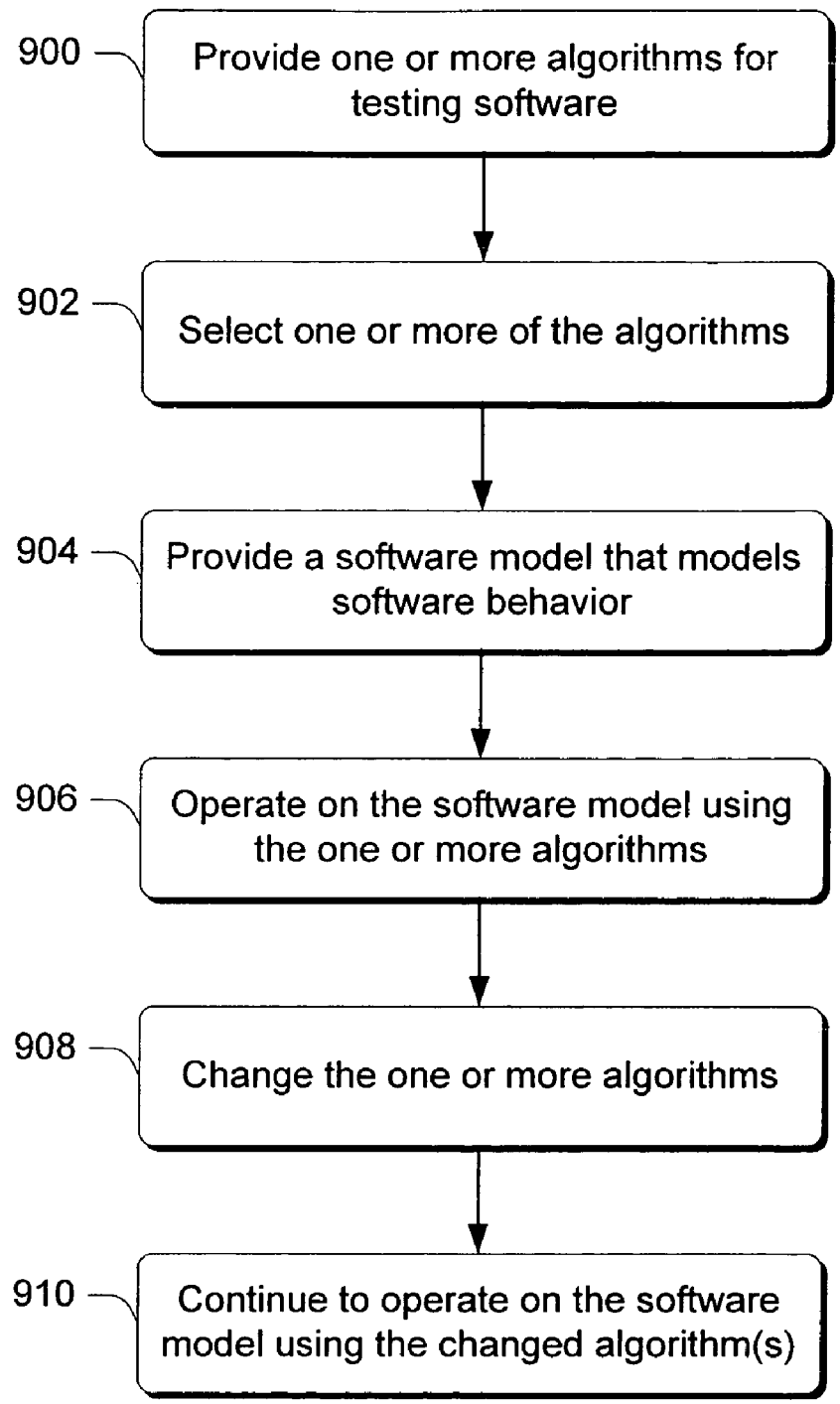
FIG. 9 is a flow diagram that describes steps in a method in accordance with one embodiment.

FIG. 9 is a flow diagram that describes steps in a method in accordance with one described embodiment. This method is desirably implemented in software. In the FIG. 3 example, various steps of this method are implemented by model processor 302.

Step 900 provides one or more algorithms for testing software. Any number and/or type of algorithms can be provided. Specific, non-limiting examples are given in FIG. 8. Other algorithms will, of course, be apparent to those of skill in the art. Step 902 selects one or more of the algorithms for use in testing the software. Step 904 provides a software model that models software behavior. One specific type of model is described above. Step 906 operates on the software model using the one or more selected algorithms.

If only one algorithm was selected at step 902, then this step can be implemented by operating on the model using a first collection of properties of the algorithm. These collections of properties can define the way in which the algorithm interacts with the model. For example, a random walk algorithm might be selected with properties that give it a purely random walk. If more than one algorithm is selected at step 902, then this step is implemented using a first of the algorithms. Step 908 changes the one or more algorithms. This step can be implemented a couple of different ways. If, for example, only one algorithm was selected at step 902, this step can be implemented by changing one or more of the properties that are associated with the algorithm so that it interacts differently with the model. In the example above where a purely random walk algorithm was selected, this step can be implemented by, for example, associating some probabilities with the algorithm such that certain actions are more likely to occur than other actions. On the other hand, if more than one algorithm was selected at step 902, this step can be implemented by selecting a second, different algorithm for use in operating on the software model. Step 910 then continues to operate on the software model using the changed algorithm or algorithms.

Figure 10:
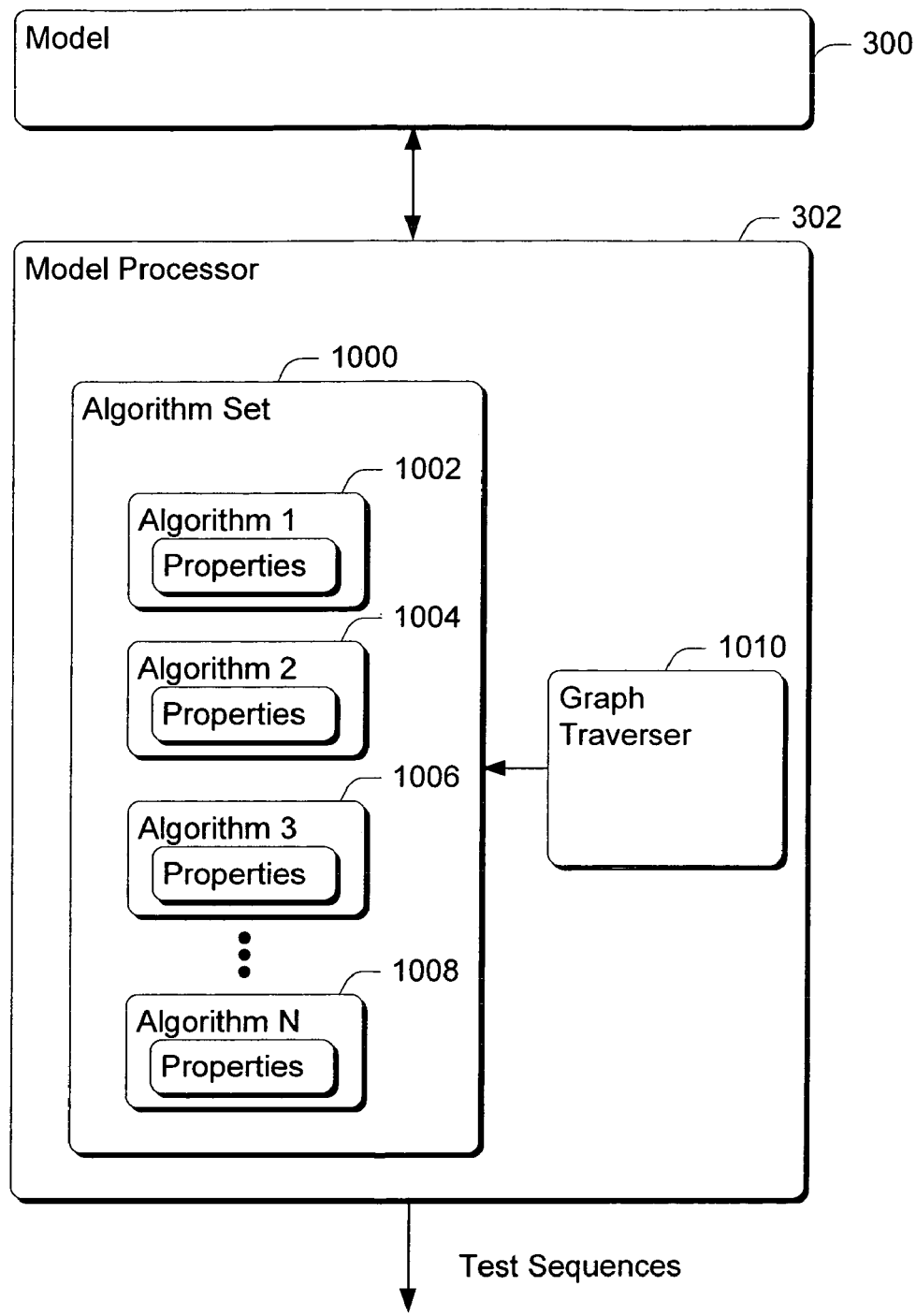
FIG. 10 is a block diagram of an exemplary model processor in accordance with one described embodiment.

Consider, for example, FIG. 10 which shows an exemplary model processor 302 in accordance with one embodiment. Model processor is configured with multiple different algorithms that comprise an algorithm set 1000. In this example, algorithm set 1000 comprises Algorithms 1-N designated 1002, 1004, 1006, and 1008 respectively. One or more of the algorithms have properties that can be manipulated to change the manner in which the algorithm interacts with a software model. In this example, all of the algorithms are shown to have such properties. In addition to the algorithm set 1000, model processor 302 includes a graph traverser 1010 whose job it is to receive the graph representation of the software, select one or more algorithms from the algorithm set, and operate upon or, in this example, traverse the graph using the selected algorithm or algorithms. The result of the graph traverser's work is a sequences of test actions that can then be used to test the software.

Example Using Random Walk and Random Destination Algorithms

Consider the case where it is desirable to achieve a wide degree of graph traversal coupled with a high degree of local traversal. Any single one of the algorithms described above would be insufficient to accomplish this goal. Yet, by blending a random walk algorithm with a random destination algorithm, this goal can be achieved. At this point it should be pointed out that when the term "random walk" is used to describe an algorithm, what is meant is a random walk type algorithm. To this extent, a random walk type algorithm need not be a pure random walk algorithm. Rather, such can embody random walk algorithms that exhibit typical characteristics of a random walk algorithm. Such characteristics can typically include, without limitation, a dependence on the nearest neighbor nodes (or next n nearest neighbors), e.g. an equal or definable probability that the next step will be one of a number of next nearest neighbor nodes.

Consider, for example, that it is desirable to traverse a great distance across a graph and then locally exploit the nodes in the area of the destination node. Such might be graphically represented as in FIG. 11. There, a starting node has been selected at the bottom of the state space. A random destination algorithm is employed to traverse across to the indicated destination node at the top of the state space. Once there, a random walk algorithm is employed to take a number of random walk steps that locally exploit the nodes around the destination node. After a period of time or a number of random walk steps, the random destination algorithm is used to traverse to another node across the state space. This second destination node appears about midway down in the state space. From there, the graph traverser 1010 (FIG. 10) can iterate through the selected algorithms.

Figure 11:
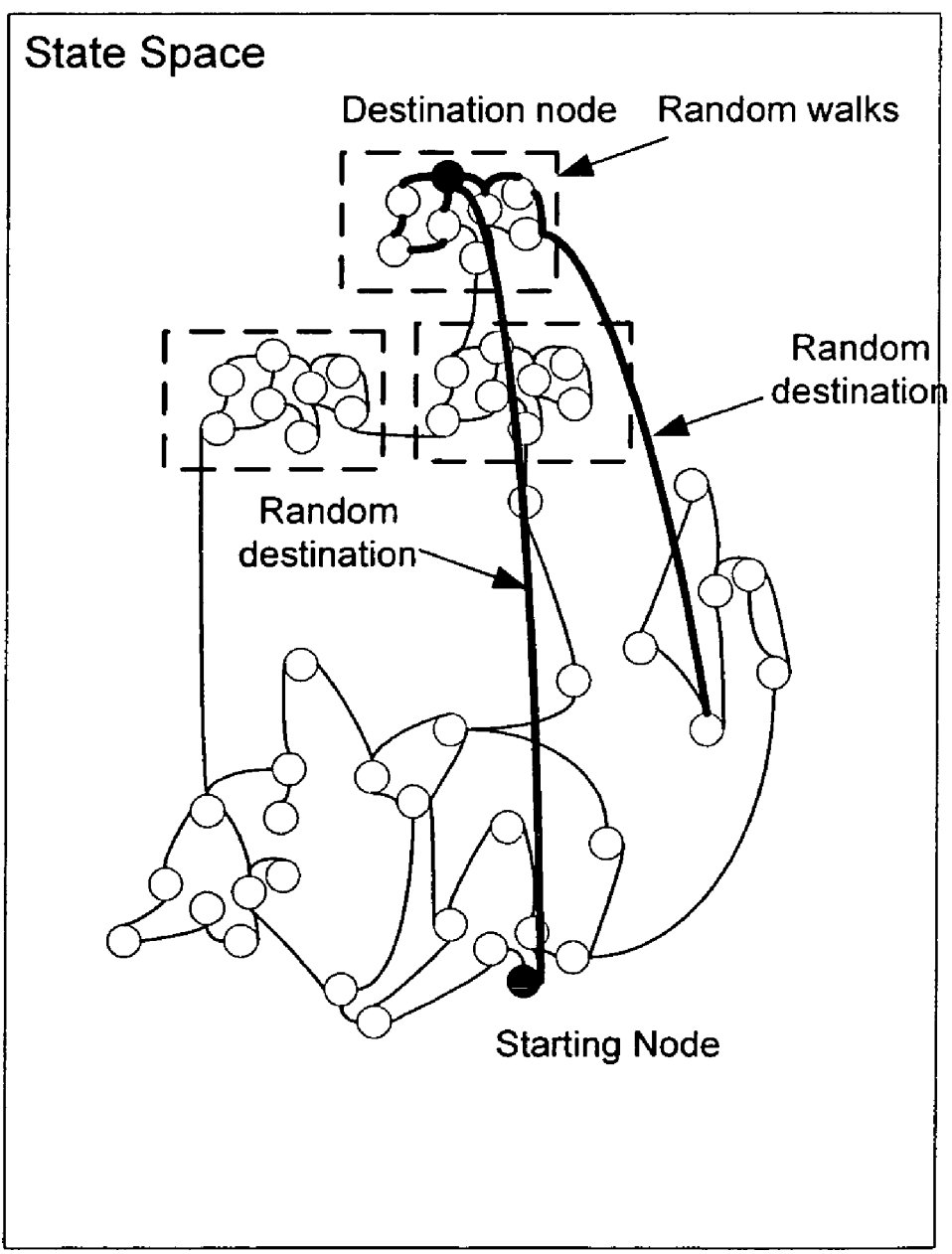
FIG. 11 is an exemplary state graph in state space showing an exemplary graph traversal.

As another example, consider a blend of an anti-random walk algorithm and a random walk algorithm. The graph traversal might look something similar to the FIG. 11 representation. A difference, however, lies in the manner in which the long traversal steps are calculated. Recall that using an anti-random walk algorithm factors in a history of where the algorithm has traversed in the past. So, in this example, every time an anti-random walk algorithm is used to traverse the state space, its destination node is of a different type than one or more of the past nodes that have been traversed. In a similar fashion, however, once the anti-random walk algorithm has traversed across the state space to find a most different node, the random walk algorithm can be used to locally exploit the nodes around the destination node. Thus, in this example, while the anti-random walk algorithm imparts a degree of determinism to the traversal, the random walk algorithm is non-deterministic. Thus, a blend of deterministic and non-deterministic testing is achieved. This kind of graph traversal mimics more closely the actions that a user might take.

Consider, for example, a typical user that is working in an Excel spreadsheet, a Word document, and has Internet Explorer opened for browsing the Web. The user might execute several actions in their Excel spreadsheet (analogous to random walks), move to Internet Explorer (analogous to an anti-random walk or random destination step) to check their stocks and execute several actions while there (analogous to random walks). Subsequently, the user might move to their Word document (analogous to an anti-random walk or random destination step) and execute several actions while there (analogous to random walks).

Figure 12:
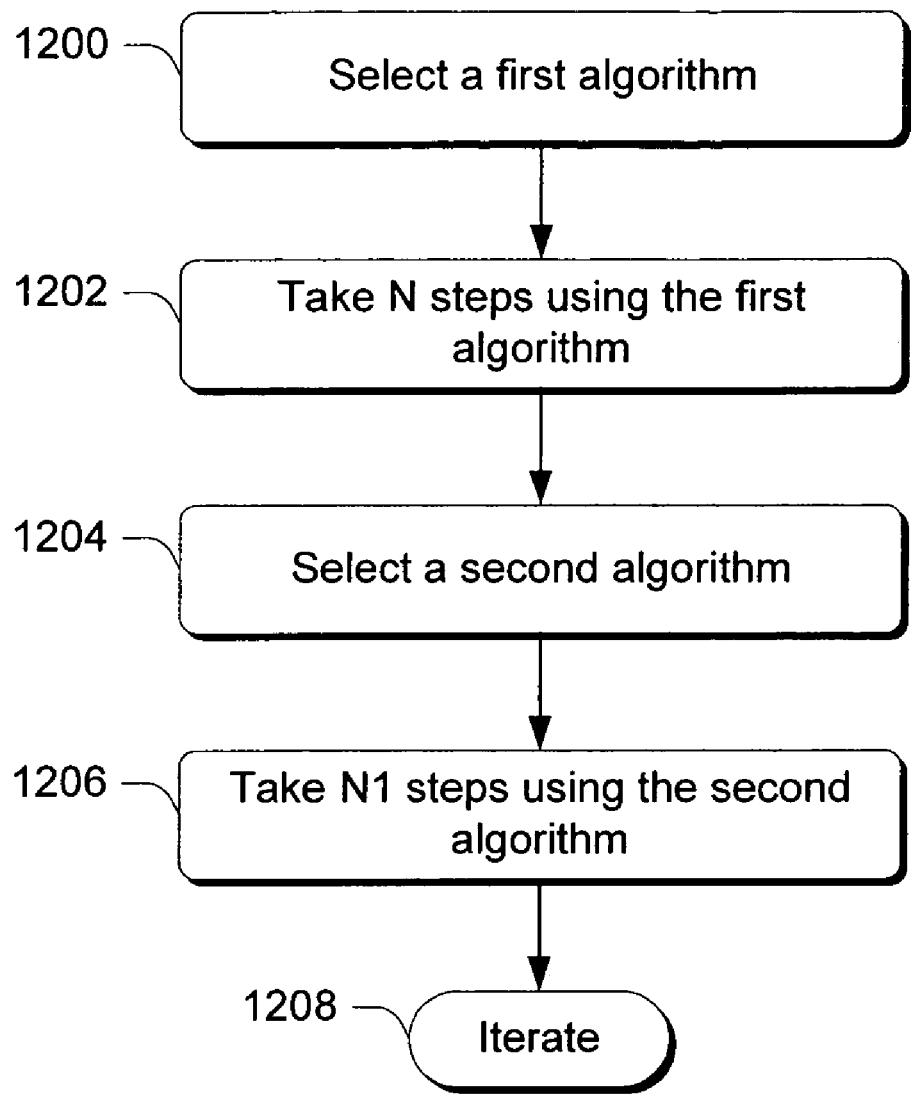
FIG. 12 is a flow diagram that describes steps in a method in accordance with one embodiment.

FIG. 12 is a flow diagram that describes steps in a method in accordance with one described embodiment. This method is implemented in software and, in the FIG. 10 example, by the model processor 302.

Step 1200 selects a first algorithm from among a number of algorithms. Any suitable number of algorithms can be provided and any method or criteria can be used for selecting the algorithm. For example, in the FIG. 10 example an algorithm set includes multiple different algorithms that can be selected.

Each of the algorithms is different. One way of differentiating between algorithms is based upon how they interact with a particular software model, e.g. their graph traversal characteristics. In the above examples, some algorithms are seen to be more deterministic than other algorithms, while some of the algorithms are seen to be more random than others. It should be appreciated and understood that the deterministic-random spectrum constitutes but one way of differentiating between possible algorithms.

Selection of a particular algorithm can be a function of the structure of the model that is being used. That is, selection of an algorithm can be context-based or context-driven. For example, in the graphs of above where clusters have been defined, a particular algorithm might be more suited to exiting the cluster (e.g. an anti-random walk or random destination algorithm) than others (e.g. random walk algorithms). In these instances, depending on the context of the traversal operation, a particular algorithm can be selected that is directed to achieving a specific result.

Step 1202 takes N steps using the first algorithm, where N is an integer. A value of N can be arrived at in any suitable way. For example, N can be predetermined or preprogrammed. Alternately, N can be randomly selected. A value can also be arrived at for N by using a Poisson distribution where there are multiple possible values for N, each with their own probability of being selected. Additionally, the probabilities assigned to the possible values for N can change over time as well as the values themselves. Needless to say, there are simply numerous ways of arriving at a value for N. This provides an added degree of flexibility in that not only can certain algorithms be selected, but the number of times the algorithm is used to traverse a graph can be controlled as well.

Step 1204 selects a second algorithm from the number of algorithms available for selection. Step 1206 then takes N1 steps using the second algorithm, where N1 is an integer. A value can be arrived at for N1 in any suitable way (such as those named above). Step 1206 takes N1 steps using the second algorithm. Step 1208 then iterates through the first and second algorithms. This step can be an optional step. If step 1208 is not employed, then different algorithms can be selected or traversal characteristics associated with the selected algorithms can be manipulated.

It is to be noted that the values of N and N1 can change during the iteration. That is, on a first pass, N and N1 can have respective first values and on a second pass, the values can change. Moreover, the methods by which the values are changed can themselves change. For example, in a first pass the values for N and N1 can be preassigned or preprogrammed. On a second pass, the values can be randomly assigned. In a third pass, the values might be assigned using a Poisson distribution, and the like. By varying the values of N and N1, the algorithms can be prevented from getting stale.

In the specific examples of FIG. 11, the first algorithm is either a random destination algorithm or an anti-random walk, while the second algorithm is a random walk algorithm.

Figure 13:
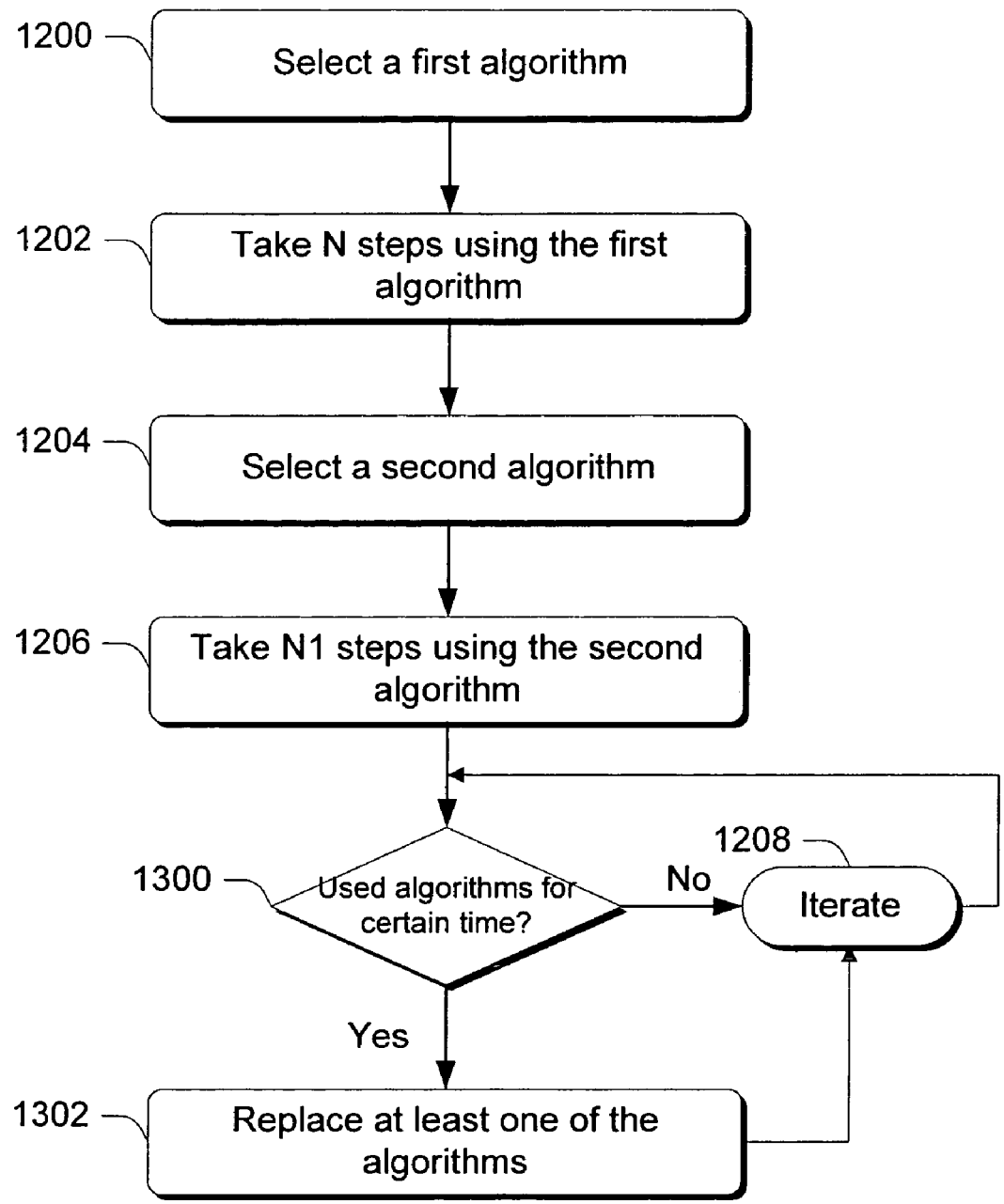
FIG. 13 is a flow diagram that describes steps in a method in accordance with one embodiment.

FIG. 13 is a flow diagram that is similar in some respects to the flow diagram of FIG. 12. To this extent, the same steps carry the same numerical designators. Different steps are designated with different numerical designators.

This method replaces one or more of the algorithms after a certain amount of time has passed. For example, after step 1206, step 1300 determines whether the algorithms have been used for a certain period of time. This time period can be defined by the user or it might randomly be selected. If step 1300 determines that the algorithms have been used for the certain time period, step 1302 replaces at least one of the algorithms and branches back to step 1208 which iterates through the algorithms (at least one of which is new). The iteration step 1208 branches to step 1300 to determine if the new algorithms have been used for a certain time period and repeats the steps described above. If, at step 1300, the algorithms have not been used for the certain time period, then step 1208 continues to iterate through the algorithms until the time period is met or exceeded.

Figure 14:
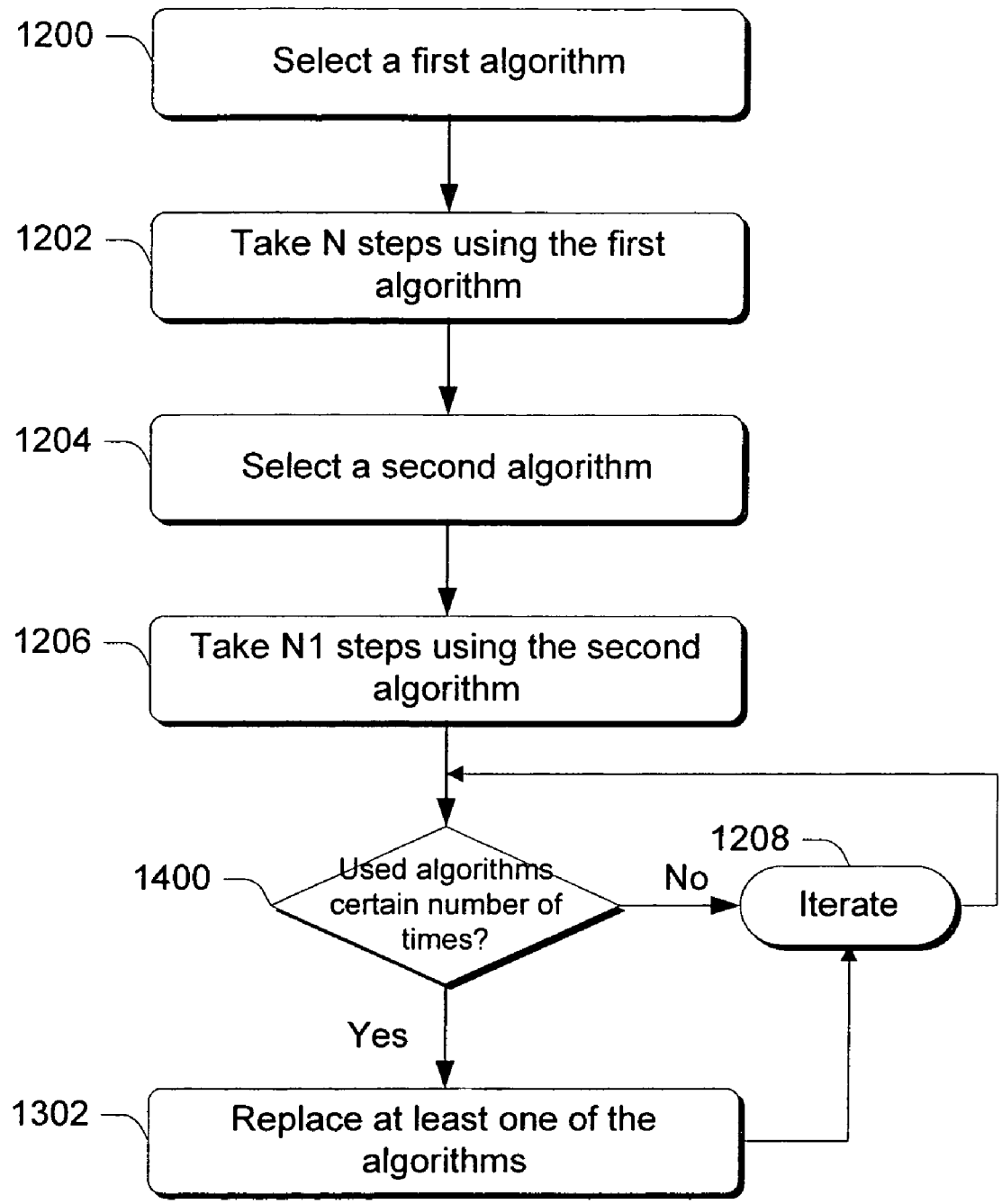
FIG. 14 is a flow diagram that describes steps in a method in accordance with one embodiment.

FIG. 14 is a flow diagram that is similar in some respects to the flow diagram of FIGS. 12 and 13. To this extent, the same steps carry the same numerical designators. Different steps are designated with different numerical designators. This method is directed to ensuring that one or more of the algorithms are changed after they are executed a certain number of times.

In this example, step 1300 of FIG. 13 has been replaced with a step 1400 which determines whether one or more of the algorithms has been used a certain number of times. If so, one or more of the algorithms are changed (step 1302). If not, the method continues to process the software model using the same algorithms until the defined threshold is exceeded.

It should be appreciated and understood that the above-described approaches with respect to FIGS. 12-14 can be mixed as well. For example, two or more algorithms might be used N and N1 number of times respectively. During iterations, the values of N and N1 might be manipulated in any of the manners described above. After one or more of the algorithms have been used a certain number of times, a new algorithm(s) might be automatically selected to replace them. After using the new algorithm for a certain period of time, it might be swapped out for a different algorithm.

Social Context Testing

In one embodiment, software testing techniques are used that are directed along social context lines. That is, there is a social context that is associated with the software that is being tested. The testing methods that are selected for testing the software are a function of the social context of the software. As an example, consider the following in connection with FIG. 15.

Figure 15:
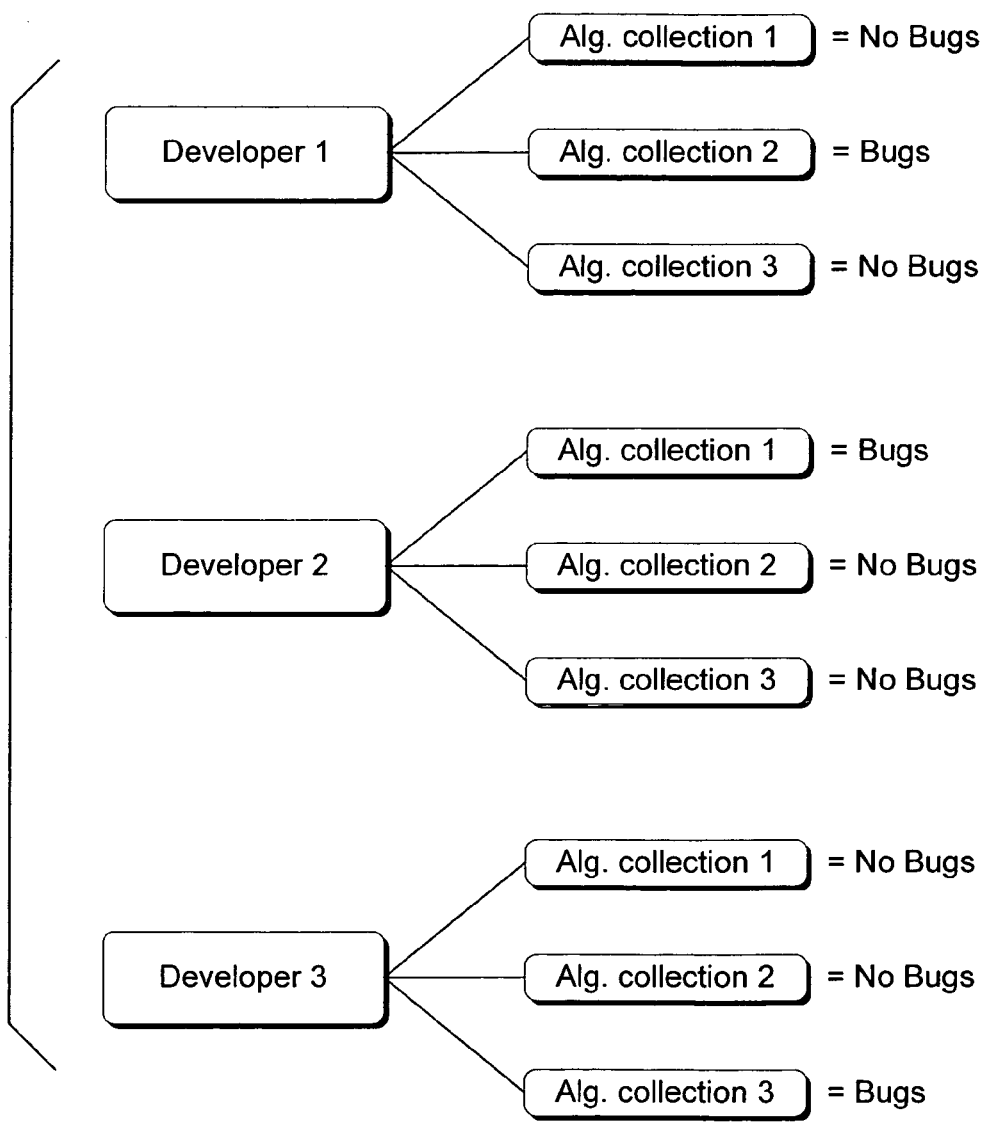
FIG. 15 is a diagram that illustrates concepts associated with one embodiment.

FIG. 15 shows three separate software developers designated as developers 1, 2, and 3. These developers are human developers who develop software for a living. The social context of the software, in this example, pertains to who developed the software. Other social contexts can include, without limitation, the physical environment in which the software is intended for use (i.e. banking software versus HVAC control software), other associated software that is configured to work with the particular software that is being tested, and the like.

Each developer is associated with multiple collections of algorithms. Each algorithm collection comprises one or more algorithms that are used to test software as described above. Notice that for developer 1, algorithm collections 1 and 3 do not typically uncover bugs in the software with any degree of regularity or significance. Notice, however, that algorithm collection 2 does tend to uncover bugs in the software that developer 1 develops. Similarly, algorithm collection 1 typically uncovers bugs associated with developer 2, while algorithm collection 3 typically uncovers bugs associated with developer 3. In this instance, over time, certain algorithm collections are found to more readily uncover bugs than other collections. Accordingly, those collections of algorithms that typically uncover bugs associated with software developed by certain developers can be used with those developers.

Figure 16:
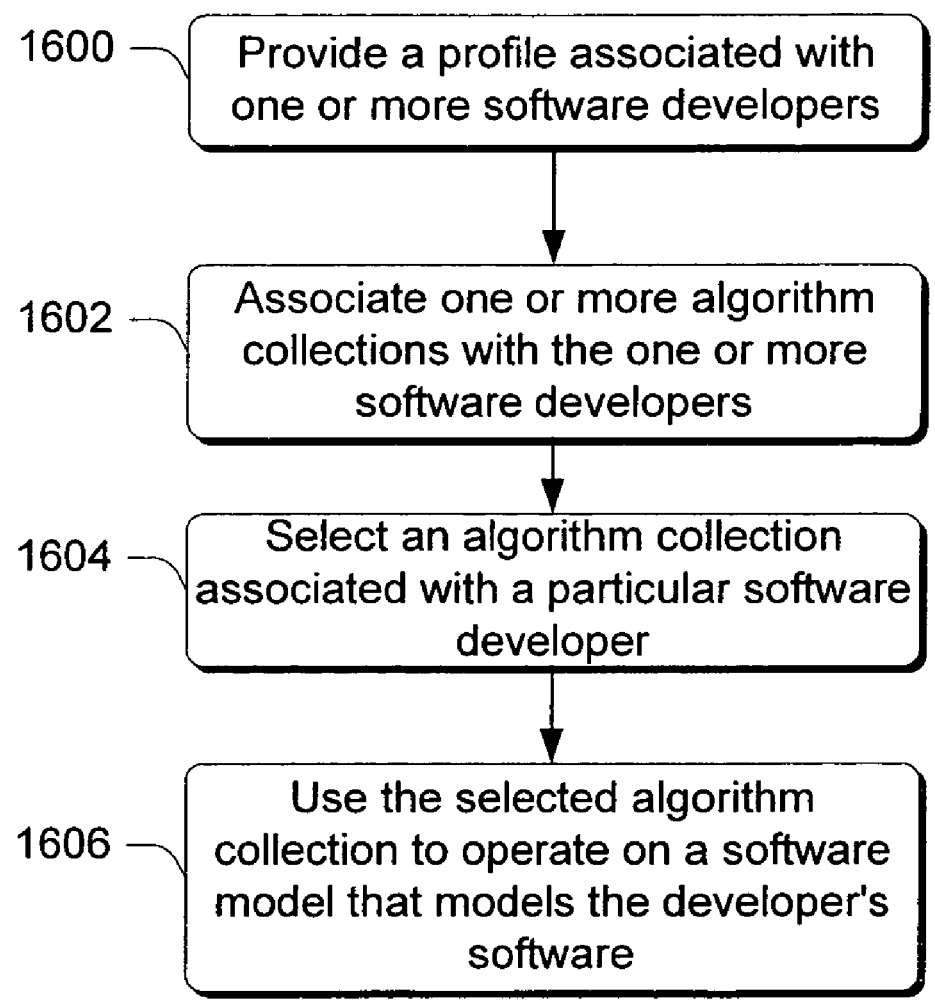
FIG. 16 is a flow diagram that describes steps in a method in accordance with one embodiment.

FIG. 16 is a flow diagram that describes steps in a method in accordance with one described embodiment. This method is implemented in software. In the FIG. 3 example, this method can be implemented by model processor 302.

Step 1600 provides a profile associated with one or more software developers. The profile can describe particular algorithms or collections of algorithms that are more likely to identify problems associated with software that is developed by the particular developer. The profile can be developed over time by simply tracking the software that has been developed by particular developers and the specific algorithms or collections of algorithms that have most successfully identified problems with the developer's software. Step 1602 associates one or more algorithm collections with the one or more developers. This step is implemented by simply noting the algorithms that are identified by the developer's profile in step 1600 and associating those algorithms or collections of algorithms with the developer. Step 1604 then selects an algorithm or collection of algorithms that are associated with a particular developer. This step can be implemented when the software is to be tested. At this point, the software has been developed to a point where it can be modeled as described above. Once the developer of the software associated with the particular model being processed is ascertained, a collection of algorithms can be selected.

Step 1606 uses the selected algorithm collection to operate on the software model that is associated with the particular software developer of interest.

Further processing can take place as described above with respect to changing the algorithms or collections of algorithms.

Testing In Clusters

As noted above, some software models can include clusters. In models where clusters are present, it can be advantageous to select certain algorithms or collections of algorithms. As an example, consider the following in connection with the FIG. 5 state space. Three exemplary clusters 506 are shown. As mentioned above, the some of the algorithms can be tailored so that a certain amount of the time they select clusters. For example, a random destination algorithm can be configured so that it either selects, at random, a node inside a cluster or the cluster itself Consider the case where it is desirable to explore a cluster's nodes locally for a while and then branch to either another cluster or another node outside of the cluster. In that case, a random destination algorithm can be used to access a cluster and then a random walk algorithm can be used N times to locally explore the nodes inside the cluster. To branch to a node outside the cluster, another random destination algorithm step can be used.

Consider the situation where it is desirable to explore generally unrelated nodes of a cluster. Here, a random destination algorithm can be used to access the cluster. Once in the cluster, an anti-random walk algorithm can be used to traverse generally unrelated nodes within the cluster. Another random destination algorithm step can then be used to exit the cluster.

Consider the case where it is desirable to achieve a wide degree of traversal within a particular cluster. In this case, a random destination algorithm can be used to access the cluster. Once in the cluster, several random destination steps can be taken in connection with random walk steps within the cluster. The random destination steps will ensure wide coverage within the cluster boundary, while the random walk steps will ensure good local coverage.

Figure 17:
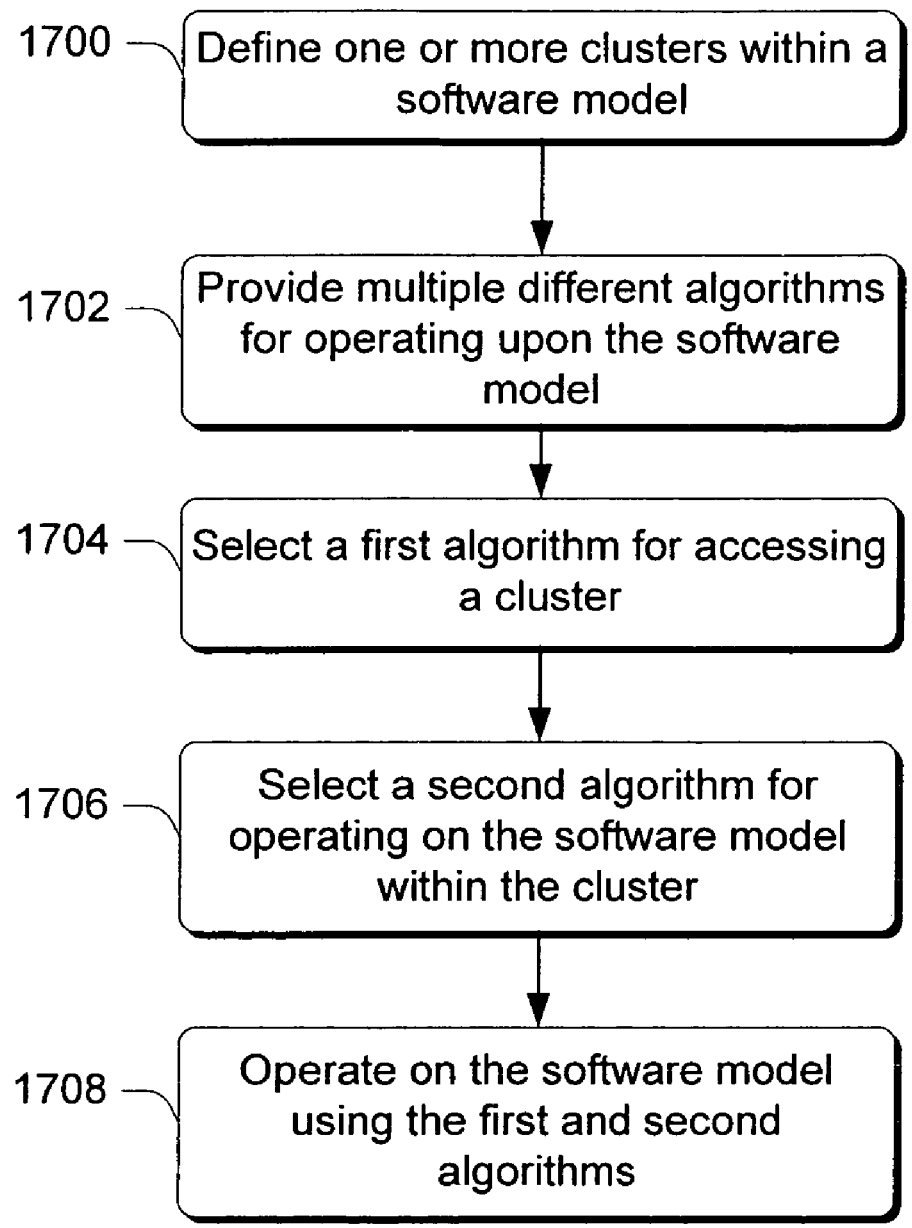
FIG. 17 is a flow diagram that describes steps in a method in accordance with one embodiment.

FIG. 17 is a flow diagram that describes steps in a software testing method that are implemented in connection with one or more clusters. Various steps of the method can be implemented using model processor 302 (FIG. 3).

Step 1700 defines one or more clusters within a software model. In the above example, the software model comprises a graph having multiple nodes. Clusters can be defined in different ways. For example, clusters can be defined based on the structure of the software itself. Clusters can also be defined based upon areas of interconnectivity. Step 1702 provides multiple different algorithms for operating upon the software model. Examples of particular types of algorithms are given above. Step 1704 selects a first algorithm for accessing a cluster. This step can be implemented by selecting an algorithm that has a high degree of likelihood that it will access a cluster. This step can also be implemented by selecting an algorithm that is specifically configured to access a cluster. Step 1706 selects a second algorithm for operating on the software model within the cluster. This second algorithm can be, but need not be different from the first algorithm.

Step 1708 operates on the software model using the first and second algorithms. This step is implemented, in the above-described example, by traversing nodes within the graph in the state space. Examples of first and second algorithms and their use in connection with clusters are given above.

It is to be appreciated and understood that the processing described above with respect to FIGS. 9, and 12-14, can take place in connection with clusters. Specifically, in this scenario, each cluster can be viewed as a sub-graph inside of which all of the above-described testing techniques can be employed.

User Modeling

In other embodiments, the inventive techniques described above can be used for modeling user actions and behavior in different software environments. That is, given that many of the above-described approaches emulate more closely the actions that a user takes when working with software, these approaches are natural choices for modeling user actions. Accordingly, it is to be appreciated and understood that the inventive techniques are not to be limited solely to testing software for the purpose of identifying bugs. Rather, such techniques can be extended to various user modeling scenarios.

As an example, consider a user working on the web, following different links for awhile. This behavior will be well modeled by a random walk on an internet graph. At some point, the user realizes that he has a meeting in half an hour, and needs to review some documents. Seemingly randomly, he chooses to close his browser, and go to the edit menu in a certain word processing document, a step well modeled by a random destination step. As a whole, that user's behavior is much better modeled by a combination of several algorithms, e.g. random walk and random destination, than by one algorithm alone.

Conclusion

The methods and systems described above provide an approach to automated software testing that more closely emulates, in one aspect, the way that people interact with software. The described methods and systems can be less deterministic than past systems and go a long way toward preventing staleness. The described methods and systems are extremely flexible and adaptable in that different blends of algorithms can be used to effect a desired traversal result.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:

one or more processors;

one or more computer-readable media having computer-readable instructions thereon which, when executed by said one or more processors, cause said one or more processors to:

model software using a software model that describes behavior associated with the software, the software model comprising a state graph having multiple nodes individual ones of which represent a state, and links between the nodes that represent actions; and operate on the software model using a random destination algorithm and at least one other different algorithm to produce a sequence of test actions, the random destination algorithm being configured to randomly select a destination node in the model and move to that destination node to produce the sequence of test actions, the selection of the destination node being performed independent of any previously-traversed nodes, and independent of any nearest neighbor nodes.

2. A system comprising:

one or more processors;

one or more computer-readable media having computer-readable instructions thereon which, when executed by said one or more processors, cause said one or more processors to:

operate on a software model using a random destination algorithm to produce a sequence of test actions, the software model comprising a state graph having multiple nodes individual ones of which represent a state, and links between the nodes that represent actions, the random destination algorithm being configured to randomly select a destination node in the state graph and move to that destination node to produce the sequence of test actions; and operate on the software model using multiple other algorithms that are different from the random destination algorithm to produce a further sequence of test actions, the multiple other algorithms being selected from a group comprising: a random walk algorithm, a Chinese postman algorithm, a Markov chain algorithm, and a anti-random walk algorithm.

3. A computer-implemented method comprising:

modeling software using a software model that describes behavior associated with the software, the software model comprising a state graph having multiple nodes individual ones of which represent a state, and links between the nodes that represent actions; and operating on the software model using a random destination algorithm and at least one other different algorithm to produce a sequence of test actions, the random destination algorithm being configured to randomly select a destination node in the model and move to that destination node to produce the sequence of test actions, the selection of the destination node being performed independent of any previously-traversed nodes, and independent of any nearest neighbor nodes.

4. A computer-implemented method comprising:

operating on a software model using a random destination algorithm to produce a sequence of test actions, the software model comprising a state graph having multiple nodes individual ones of which represent a state, and links between the nodes that represent actions, the random destination algorithm being configured to randomly select a destination node in the state graph and move to that destination node to produce the sequence of test actions; and operating on the software model using multiple other algorithms that are different from the random destination algorithm to produce a further sequence of test actions, the multiple other algorithms being selected from a group comprising: a random walk algorithm, a Chinese postman algorithm, a Markov chain algorithm, and a anti-random walk algorithm.

5. A system comprising: a processor;

means for modeling software using a software model that describes behavior associated with the software, the software model comprising a state graph having multiple nodes individual ones of which represent a state, and links between the nodes that represent actions; and means for operating on the software model using a random destination algorithm and at least one other different algorithm to produce a sequence of test actions, the random destination algorithm being configured to randomly select a destination node in the model and move to that destination node to produce the sequence of test actions, the selection of the destination node being performed independent of any previously-traversed nodes, and independent of any nearest neighbor nodes.

6. A system comprising: a processor;

means for operating on a software model using a random destination algorithm to produce a sequence of test actions, the software model comprising a state graph having multiple nodes individual ones of which represent a state, and links between the nodes that represent actions, the random destination algorithm being configured to randomly select a destination node in the state graph and move to that destination node to produce the sequence of test actions; and means for operating on the software model using multiple other algorithms that are different from the random destination algorithm to produce a further sequence of test actions, the multiple other algorithms being selected from a group comprising: a random walk algorithm, a Chinese postman algorithm, a Markov chain algorithm, and a anti-random walk algorithm.

\* \* \* \* \*